US010384292B2

(12) United States Patent
Lizotte et al.

(10) Patent No.: US 10,384,292 B2
(45) Date of Patent: Aug. 20, 2019

(54) SELF-ADJUSTING WIRE FEEDER MOUNTING ASSEMBLY

(71) Applicant: ILLINOIS TOOL WORKS INC., Glenview, IL (US)

(72) Inventors: Ryan M. Lizotte, Belle River (CA); Lloyd J. Steed, Amherstburg (CA)

(73) Assignee: Illinois Tool Works Inc., Glenview, IL (US)

( * ) Notice: Subject to any disclaimer, the term of this patent is extended or adjusted under 35 U.S.C. 154(b) by 381 days.

(21) Appl. No.: 14/109,034

(22) Filed: Dec. 17, 2013

(65) Prior Publication Data

US 2014/0166626 A1 Jun. 19, 2014

Related U.S. Application Data

(60) Provisional application No. 61/738,680, filed on Dec. 18, 2012.

(51) Int. Cl.
| | | |
|---|---|---|
| *B23K 9/133* | (2006.01) | |
| *B23K 9/12* | (2006.01) | |
| *B23K 9/16* | (2006.01) | |
| *B23K 9/28* | (2006.01) | |
| *B23K 9/173* | (2006.01) | |
| *B25J 19/00* | (2006.01) | |

(52) U.S. Cl.
CPC ............ *B23K 9/125* (2013.01); *B23K 9/1336* (2013.01); *B23K 9/16* (2013.01); *B23K 9/173* (2013.01); *B23K 9/287* (2013.01); *B25J 19/0025* (2013.01)

(58) Field of Classification Search
CPC ........ B23K 9/12; B23K 9/125; B23K 9/1336; B23K 9/173; B23K 9/16; B23K 9/287

USPC ........ 219/137.31, 137.44, 137.7, 137.2, 136, 219/130.1

See application file for complete search history.

(56) References Cited

U.S. PATENT DOCUMENTS

| | | | | |
|---|---|---|---|---|
| 4,539,465 A | | 9/1985 | Bosna | |
| 4,883,939 A | * | 11/1989 | Sagi .................. | B23K 9/287 219/125.1 |
| 5,916,464 A | * | 6/1999 | Geiger ............... | B23K 9/1336 219/130.4 |
| 6,142,002 A | * | 11/2000 | Itaya .................. | B21F 3/04 72/137 |

(Continued)

FOREIGN PATENT DOCUMENTS

| | | |
|---|---|---|
| DE | 297 20 048 | 3/1999 |
| EP | 1 440 760 | 7/2004 |

(Continued)

OTHER PUBLICATIONS

International Search Report in PCT/US2013/075703 dated May 9, 2014.

*Primary Examiner* — Dana Ross
*Assistant Examiner* — Ayub A Maye
(74) *Attorney, Agent, or Firm* — McAndrews, Held & Malloy, Ltd.

(57) ABSTRACT

A self-adjusting wire feeder mounting assembly includes a mount fixedly connectable to a multi-axis robotic arm, and a slidable, floating adapter plate for mounting of a wire feeder thereon. The adapter plate is coupled with and slidable about the mount, and the adapter plate is moveable relative to the mount when a force is applied to the wire feeder.

5 Claims, 7 Drawing Sheets

(56) References Cited

U.S. PATENT DOCUMENTS

| | | | | |
|---|---|---|---|---|
| 6,151,942 A * | 11/2000 | Itaya | ............... | B21F 3/04 |
| | | | | 72/137 |
| 6,388,234 B1 * | 5/2002 | Collins | ............ | B23K 9/1336 |
| | | | | 219/137.2 |
| 6,571,591 B2 * | 6/2003 | Itaya | ............... | B21F 3/02 |
| | | | | 72/135 |
| 7,105,771 B2 * | 9/2006 | Inoue | ............ | B23K 9/1336 |
| | | | | 219/125.1 |
| 7,134,305 B2 * | 11/2006 | Wu | ............... | B21F 3/02 |
| | | | | 72/137 |
| 7,143,620 B2 * | 12/2006 | Itaya | ............... | B21F 3/02 |
| | | | | 72/137 |
| 7,173,213 B2 * | 2/2007 | Inoue | ............ | B23K 9/1336 |
| | | | | 219/125.1 |
| 7,241,969 B2 * | 7/2007 | Inoue | ............ | B25J 19/0025 |
| | | | | 219/125.1 |
| 8,117,939 B2 * | 2/2012 | Burlot | ............ | B25J 19/0025 |
| | | | | 74/490.02 |
| 8,573,014 B2 * | 11/2013 | Tsuritani | ............ | B21F 3/02 |
| | | | | 72/135 |
| 8,607,607 B1 * | 12/2013 | Sanderson | ............ | B30B 11/08 |
| | | | | 140/140 |

FOREIGN PATENT DOCUMENTS

| | | |
|---|---|---|
| EP | 1 611 988 | 1/2006 |
| JP | H11-077306 | 3/1999 |
| JP | 2006-068806 | 3/2006 |

\* cited by examiner

SELF-ADJUSTING WIRE FEEDER MOUNTING ASSEMBLY

CROSS REFERENCE TO RELATED APPLICATION

This application claims the priority of U.S. Provisional Application No. 61/738,680 filed Dec. 18, 2012.

TECHNICAL FIELD

This disclosure relates to through-arm robotic MIG welding torch systems, and more particularly to a wire feeder mounting assembly for a through-arm robotic MIG welding torch system.

BACKGROUND OF THE INVENTION

A through-arm robotic MIG welding torch system generally includes a multi-axis robotic arm and a welding torch mounted to a distal end of the robotic arm. A power cable connects the welding torch to a source of welding power, consumable electrode wire, shielding gas, and optionally cooling liquid. The power cable may be a unicable design in which welding power, electrode wire, shielding gas, and optionally cooling liquid are all transferred within a single cable assembly from the source to the welding torch. The power cable extends from the source and internally through the robotic arm to the welding torch.

In all through-arm robotic MIG welding torch systems, the power cable has a fixed length. Also, as shown in FIG. 1, conventionally the wire feeder 10 connected to the power cable 12 is fixedly mounted on the robotic arm 14 such that the wire feeder is stationary relative to the robotic arm. As the robotic arm 14 moves in a robotic path shown by two-headed arrow 16 (for instance, the robotic arm may rotate about its 5th axis from at least a +120 degree disposition to at least a −120 degree disposition), the power cable 12 binds/compresses because it cannot extend or contract in length due to the fixed position of both ends of the power cable (fixed point 18, fixed point 20). This causes unwanted stress in the power cable 12 as well as the wire, liner, and other components located internally in the cable. If the power cable becomes bound within the robotic arm, a harsh "snapping" transition occurs when the robotic arm articulates back to its original disposition. This "snapping" transition also results in increased wear and stress on the system, all of which can lead to premature power cable failure and undesirable downtime.

SUMMARY OF THE INVENTION

Disclosed is a self-adjusting wire feeder mechanism and assembly that allows for dynamic sliding movement of a welding wire feeder during manipulation of an associated robotic arm in response to forces applied on the wire feeder by a connected power cable. The front end of the power cable remains fixed to the front end of the robot, while the wire feeder connected to the back end of the power cable slides fore and aft via the forces exerted on the power cable during articulation of the robotic arm. An exemplary embodiment thereby relieves the stresses exerted on the power cable and reduces the occurrence of binding of the power cable when moving the robotic arm, especially when the robotic arm is rotated about its end axes (e.g., its fifth axis) proximate the wire feeder. The assembly also makes the overall length of the power cable less critical, as the system may self-adjust in response to changes in the length of the cable.

In one embodiment, a self-adjusting wire feeder mounting assembly includes a mount fixedly connectable to a multi-axis robotic arm, and a slidable, floating adapter plate for mounting of a wire feeder thereon. The adapter plate is coupled with and slidable about the mount, and the adapter plate is moveable relative to the mount when a force is applied to the wire feeder.

In another embodiment, a self-adjusting wire feeder mounting assembly includes a mounting bracket fixedly connectable to a multi-axis robotic arm, and a slidable adapter plate having a mounting surface for mounting a wire feeder thereon. The slidable adapter plate is coupled with and slidable relative to the mounting bracket. At least one resilient member biases the slidable adapter plate relative to the mounting bracket. The slidable adapter plate is linearly moveable along the mounting bracket in both a forward direction and an opposite backward direction.

The slidable adapter plate and the mounting bracket may be coupled via a linear track. The linear track may be defined by a plurality of bolts. Each of the at least one resilient member may be a spring. The resilient member(s) are disposed on the bolts. A mounting plate may be connected to the mounting surface of the adapter plate for mounting the wire feeder on the adapter plate.

A robotic MIG welding torch system includes a multi-axis robotic arm having a distal, tool mounting end, a welding torch mounted on the distal, tool mounting end, a wire feeder, a power cable connected on one end to the welding torch and extending through the multi-axis robotic arm, the power cable being connected on an opposite end to the wire feeder, and the self-adjusting wire feeder mounting assembly. The wire feeder is mounted on the slidable adapter plate of the self-adjusting wire feeder mounting assembly, and the wire feeder moves linearly during manipulation of the multi-axis robotic arm, reducing slack in the welding torch cable and reducing the occurrence of binding of the power cable. Movement of the slidable adapter plate moves the wire feeder toward and away from the multi-axis robotic arm, thereby adjusting the position of the cable end connected to the wire feeder relative to the multi-axis robotic arm.

A method of adjusting the position of a wire feeder of a welding torch may include fixedly mounting a mounting bracket on a multi-axis robotic arm, coupling a slidable adapter plate with the mounting bracket, mounting a wire feeder on the slidable adapter plate, and connecting a welding power cable to the wire feeder, the welding power cable extending through the multi-axis robotic arm and being connected at a distal end of the robotic arm to a welding torch. Movement of the multi-axis robotic arm generates tension in the welding power cable, which causes movement of the wire feeder mounted on the slidable adapter plate relative to the fixed mounting bracket, thereby reducing slack in the power cable and preventing binding of the power cable.

The method may further include the step of linearly moving the wire feeder in a forward/backward direction relative to the multi-axis robotic arm, and the step of biasing the slidable adapter plate in one or both of a forward and rearward direction relative to the multi-axis robotic arm.

These and other features and advantages of the assembly will be more fully understood from the following detailed description of the invention taken together with the accompanying drawings.

DETAILED DESCRIPTION OF THE INVENTION

Figure 1:
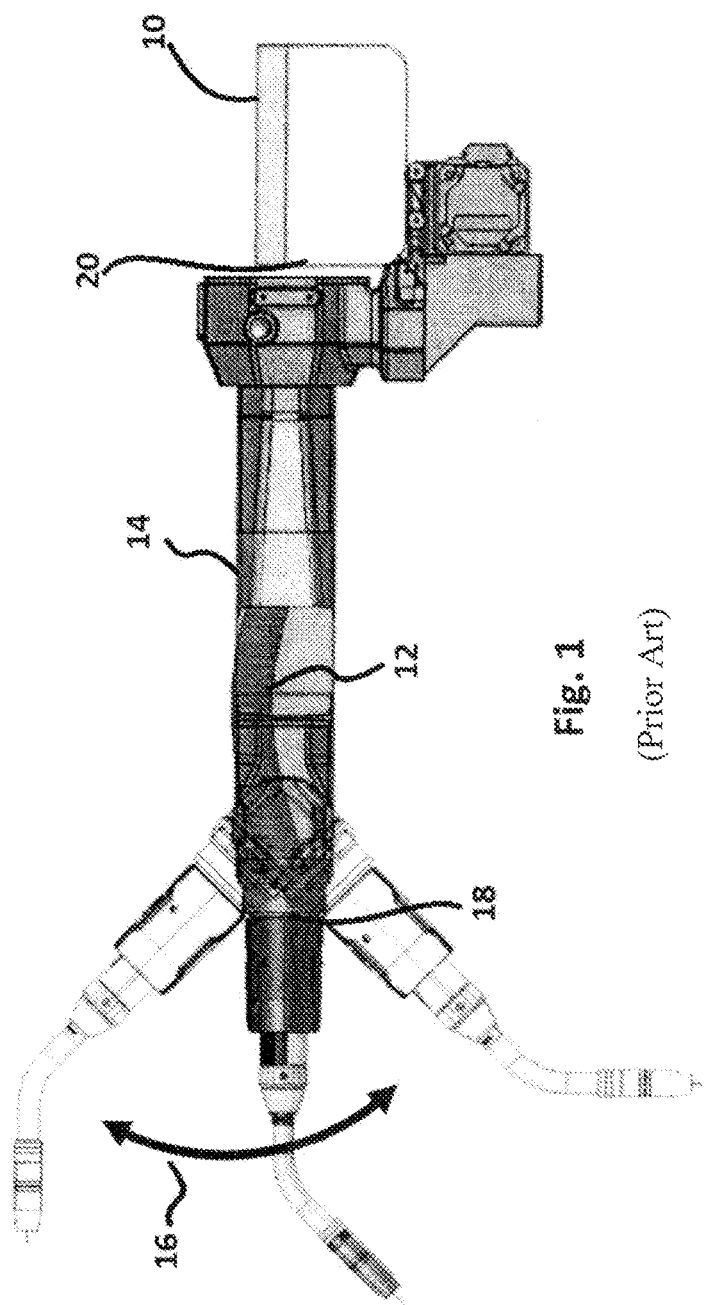
FIG. 1 is a schematic view of a robotic MIG welding torch and mounted wire feeder according to the prior art.
Figure 2:
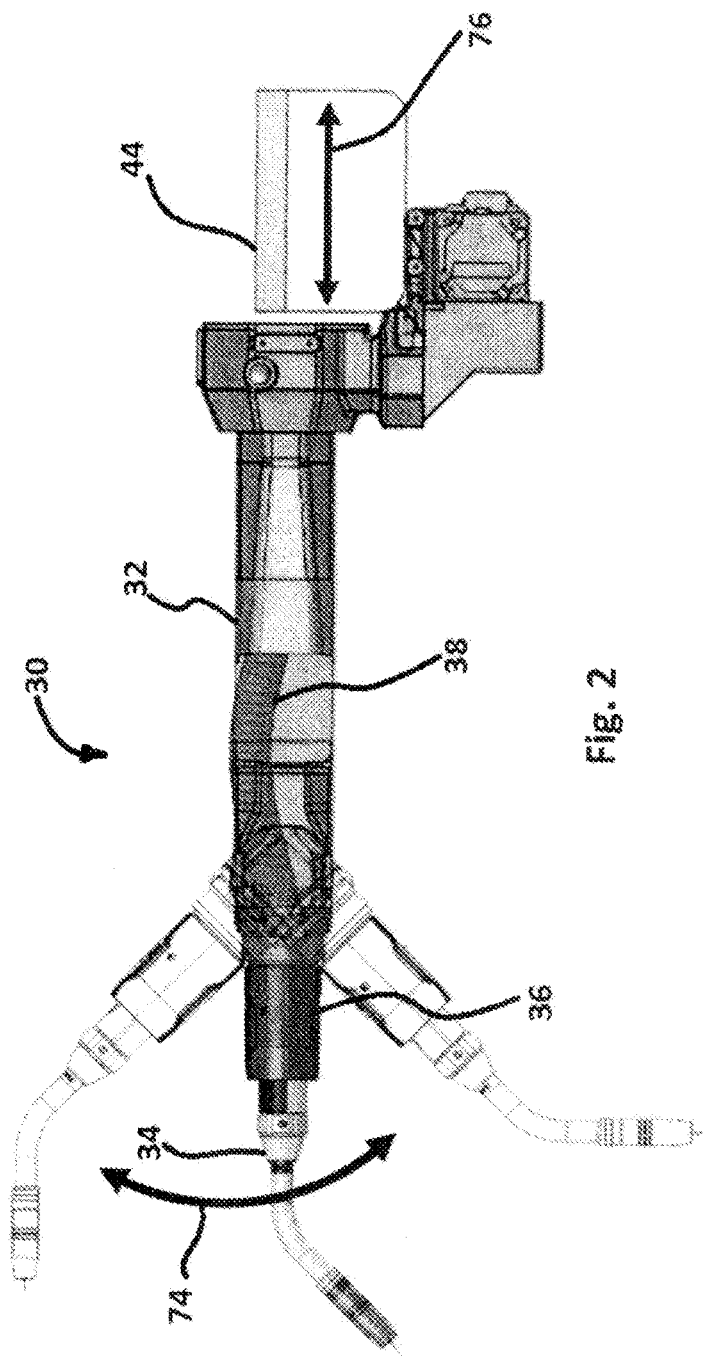
FIG. 2 is a schematic view of a robotic MIG welding torch system showing cooperative movement of a robotic arm and wire feeder of the system.

With reference to FIG. 2, a robotic welding torch system 30 disclosed includes a multi-axis controllable robotic arm 32. A welding torch 34 is mounted on a distal end 36 of the robotic arm 32 via an end effecter or other mounting structure. A welding power cable 38 is connected on one end to the welding torch 34. The power cable 38 extends through or along the robotic arm 32. The opposite end of the power cable 38 is connected to a wire feeder 44. The power cable 38 may be a unicable or similar multipurpose cable which transmits welding power and consumable electrode welding wire from the wire feeder 44 to the welding torch 34. The wire feeder 44 is floatably mounted on the robotic arm 32 such that the forces exerted on the power cable 38 by movement of the robotic arm 32 push and pull the wire feeder 44 back and forth to relieve stress in the power cable.

Figure 3:
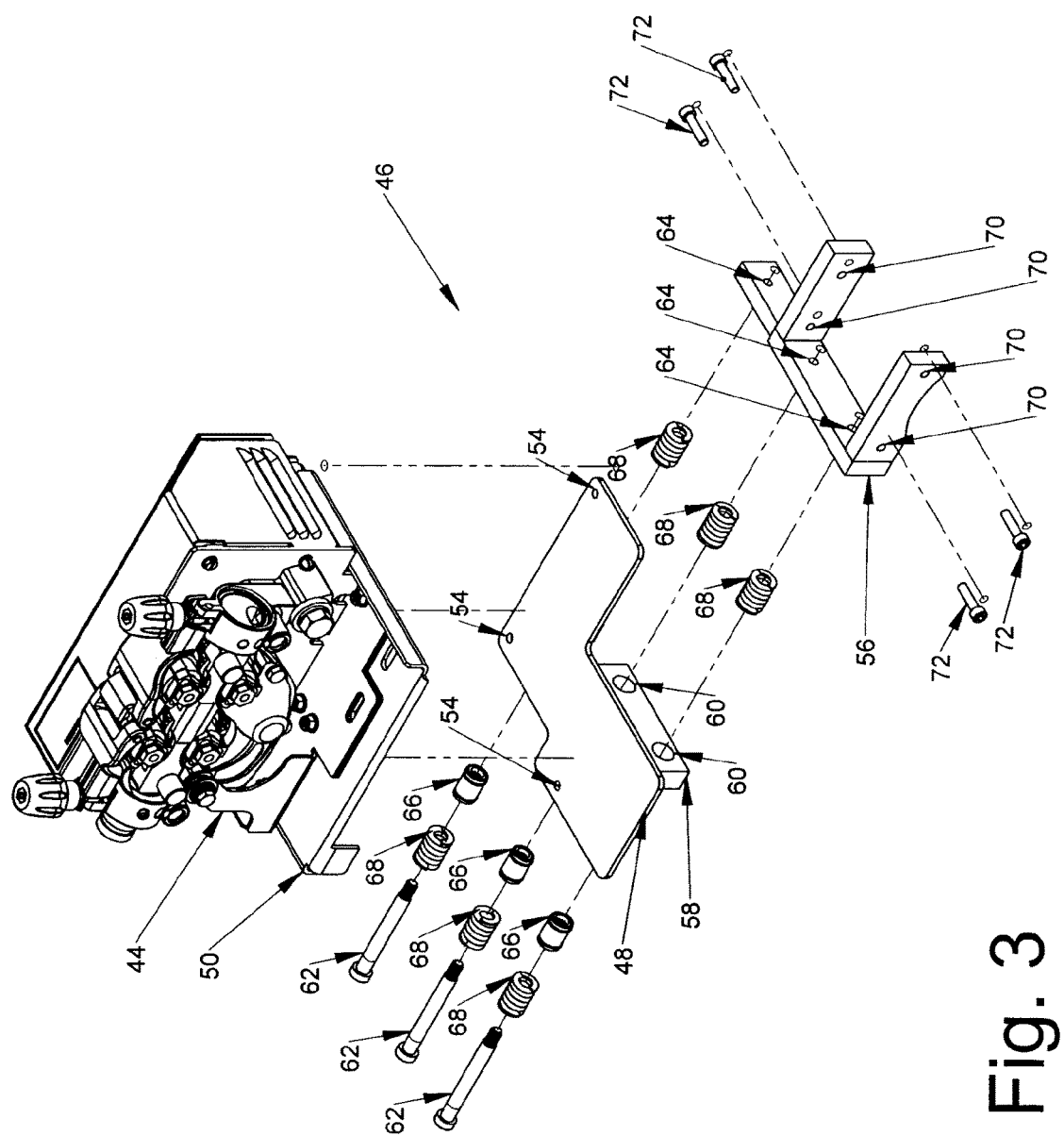
FIG. 3 is an exploded view of a self-adjusting wire feeder mounting assembly of the robotic MIG welding torch system.
Figure 4:
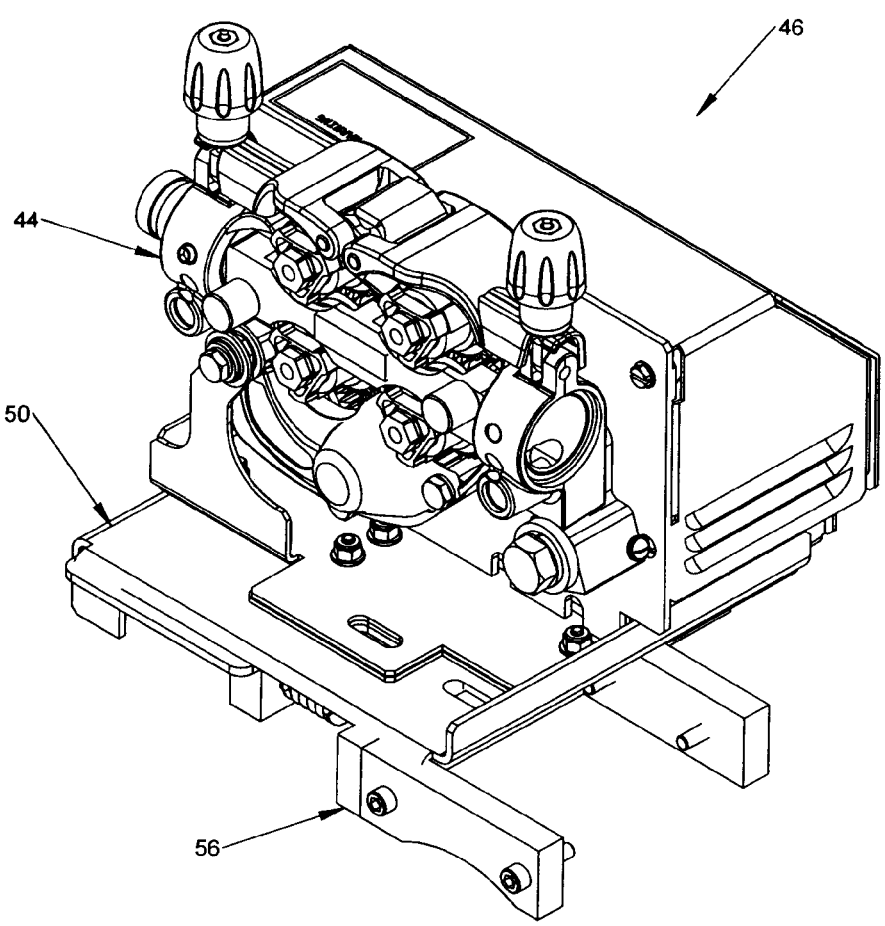
FIG. 4 is a perspective view of the self-adjusting wire feeder mounting assembly in a fully extended disposition.
Figure 5:
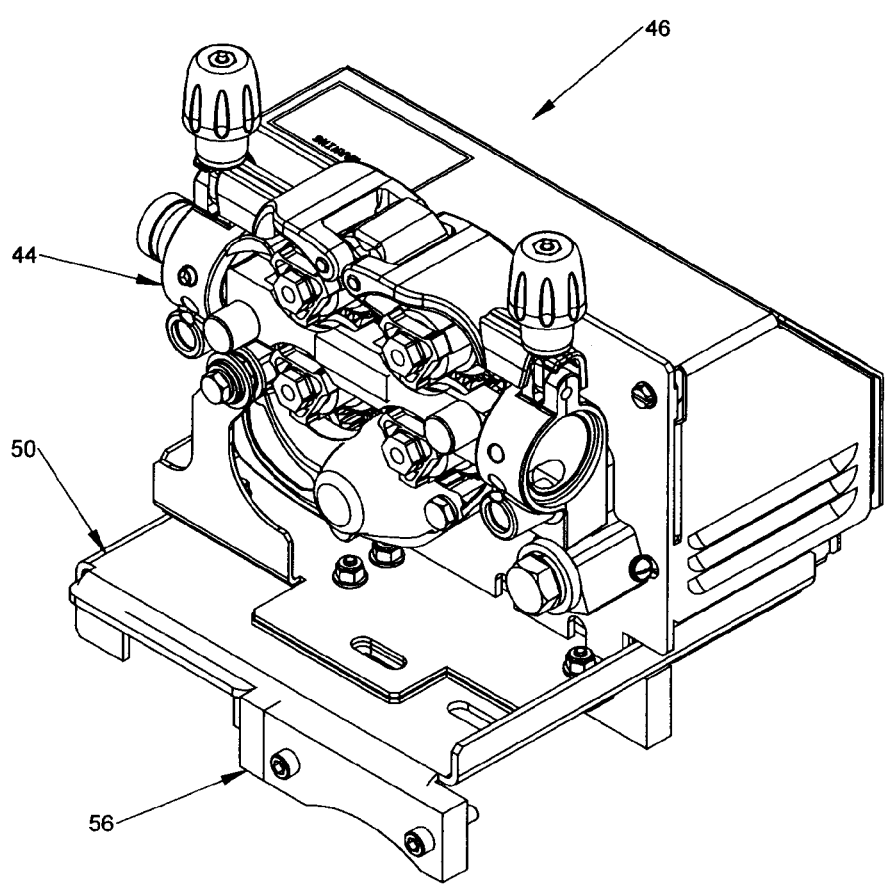
FIG. 5 is a perspective view of the self-adjusting wire feeder mounting assembly in a fully retracted disposition.

Turning to FIGS. 3-5, the wire feeder is floatably mounted on the robotic arm by a self-adjusting wire feeder mounting assembly 46. In one embodiment, the wire feeder mounting assembly 46 includes a slidable, floating adapter plate 48 having an upper mounting surface 50 on which the wire feeder 44 is mounted. The wire feeder 44 is fastened to a mounting plate 52, and the mounting plate is in turn fastened to the adapter plate 48 via through-holes 54 in the adapter plate. The mounting plate 52 may be feeder specific, i.e. designed to mount a specific make and/or model of wire feeder. The wire feeder 44 is shown in a partial cutaway view in order to expose the fastening of the wire feeder to the mounting plate. Alternatively, the wire feeder 44 may be directly mounted on the adapter plate.

The adapter plate 48 is coupled with and slidable relative to a stationary mount, such as mounting bracket 56, via a linear track. Specifically, one or more flanges 58 extend from a lower surface of the adapter plate 48 (opposite the upper mounting surface 50). The flange(s) 58 include opening(s) 60. A shoulder bolt 62 is inserted through each opening 60 and screwed into a corresponding aperture 64 in the mounting bracket 56. The shanks of the shoulder bolts 62 define the linear track on which the adapter plate slides. A bearing 66 may be disposed in each opening 60 to facilitate movement of the adapter plate 48 along the shoulder bolts 62. Resilient members 68 such as coil springs or similar are disposed on the shanks of the shoulder bolts 62 on both sides of the flange(s) 58. The resilient members 68 bias the adapter plate 48 in forward and backward directions as the adapter plate moves along the shoulder bolts 62.

Figure 6:
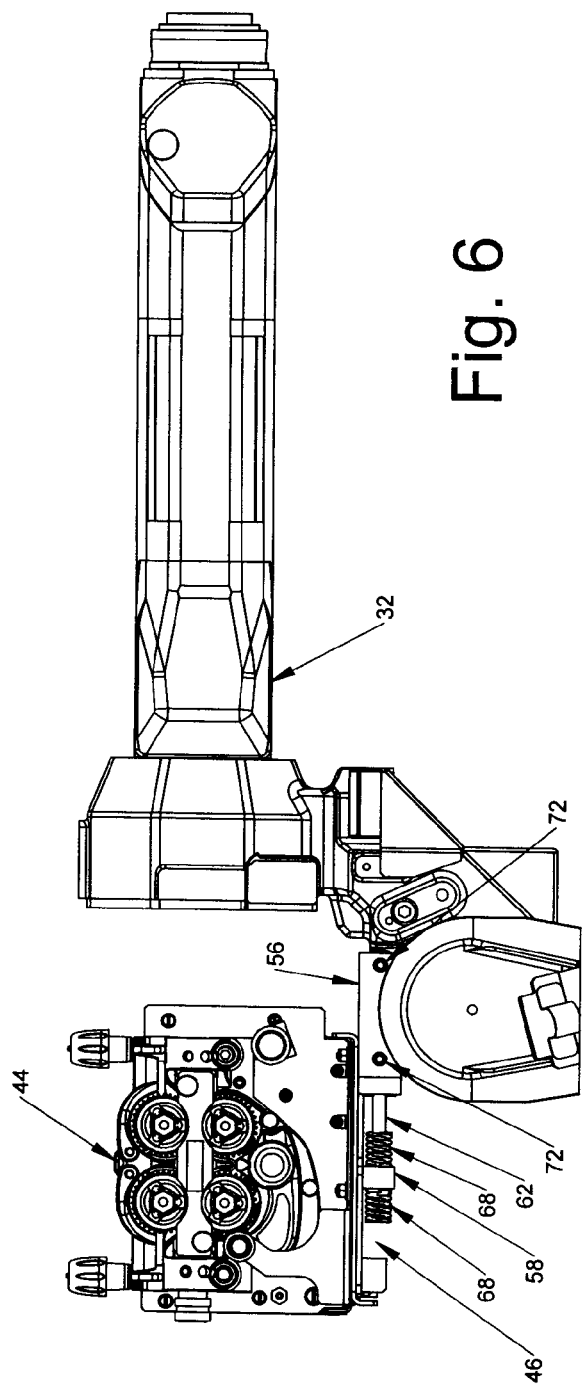
FIG. 6 is a side view of the self-adjusting wire feeder mounting assembly mounted on a robotic arm and in the fully extended disposition.
Figure 7:
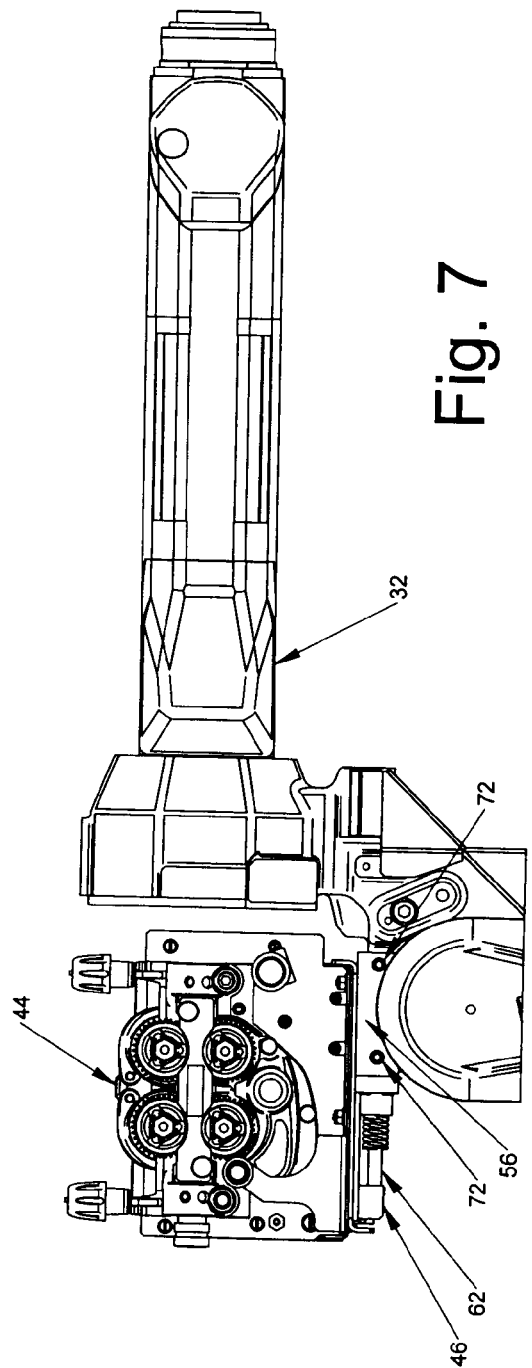
FIG. 7 is a side view of the self-adjusting wire feeder mounting assembly mounted on the robotic arm and in the fully retracted disposition.

The mounting bracket 56 is fixedly connected to an exterior of the robotic arm 32 such as a location proximate a rear, shoulder end of the arm as shown in FIGS. 6 and 7. For example, the mounting bracket 56 includes apertures 70 through which fasteners 72 such as SHCS (socket head cap screw) type fasteners or similar attach the mounting bracket to the robotic arm. The mounting bracket 56 may be robot specific, i.e. designed to mount on a specific make and/or model of robotic arm.

The self-adjusting mounting assembly 46 provides for slidable movement of the wire feeder relative to the robotic arm. As the robotic arm 32 moves about its axes (for example as shown schematically by two-headed arrow 74 in FIG. 2), force is exerted on the power cable 38 that extends through the robotic arm. This force acts upon the wire feeder 44 at the end of the power cable to either push the wire feeder backward away from the robotic arm 32 or forward toward the robotic arm 32 (as shown schematically by two-headed arrow 76 in FIG. 2). The self-adjusting mounting assembly 46 can move between a fully extended disposition as shown in FIGS. 4 and 6 and a fully retracted disposition as shown in FIGS. 5 and 7. For example, when a force is applied by the power cable 38 against the wire feeder 44 (in a direction away from the robotic arm 32) caused by compression of the power cable, the adapter plate 48 slides linearly in the same direction backwards away from the robotic arm. The resilient members 68 on the back side of the flange(s) 58 are compressed by the applied force. When the force is removed, the resilient members 68 return to their uncompressed, resting state, thereby sliding the adapter plate 48 linearly in a forward direction back toward the robotic arm 32. Similarly, if the power cable 38 applies a pulling force to the wire feeder 44 (in a direction toward the robotic arm 32), the adapter plate 48 slides linearly in the same direction toward the robotic arm. The resilient members 68 on the front side of the flange(s) 58 are compressed by the applied force. When the force is removed, the resilient members 68 return to their uncompressed, resting state, thereby sliding the adapter plate 48 linearly in a backward direction away from the robotic arm 32. Since the floating wire feeder absorbs the forces exerted on the power cable (by utilizing those forces to move the adapter plate 48 along the shoulder bolts 62), the power cable does not bind, snap, or stretch within the robotic arm. This reduces wear of the power cable and reduces premature failure of the power cable.

Although the assembly has been described by reference to a specific embodiment, it should be understood that numerous changes may be made within the spirit and scope of the inventive concepts described. Accordingly, it is intended that the assembly not be limited to the described embodiment, but that it have the full scope defined by the language of the following claims.

What is claimed is:

1. A robotic MIG welding torch system comprising: a multi-axis robotic arm having a distal, tool mounting end; a welding torch mounted on said distal, tool mounting end; a wire feeder; a power cable connected on one end to the welding torch and extending through said multi-axis robotic arm, said power cable being connected on an opposite end to said wire feeder; and a self-adjusting wire feeder mounting assembly, comprising: a mounting bracket fixedly connected to the multi-axis robotic arm, a slidable adapter plate including a mounting surface, a lower surface opposite the mounting surface, and a flange extending from the lower surface, the wire feeder being mounted on the mounting surface, said slidable adapter plate being coupled with said mounting bracket via a stationary track, said stationary track being defined by three stationary bolts, each of the three stationary bolts having an end that is screwed into and fixedly connected to said mounting bracket such that a shank of each bolt extends outwardly from only one same side of said mounting bracket, said slidable adapter plate including a plurality of openings in said flange through which said bolts are inserted such that said slidable adapter plate is slidable along said bolts, and a plurality of resilient members biasing said slidable adapter plate relative to said mounting bracket, each bolt being inserted through two of said resilient members such that said two resilient members are disposed on opposite sides of said flange of said adapter plate, wherein said slidable adapter plate is linearly moveable along said mounting bracket in both a forward direction and an opposite backward direction during manipulation of said multi-axis robotic arm, reducing slack in said power cable and reducing occurrence of binding of said power cable.

2. The robotic MIG welding torch system of claim 1, wherein movement of said, slidable adapter plate moves said wire feeder toward and away from said multi-axis robotic arm, thereby adjusting position of the power cable connected to said wire feeder relative to said multi-axis robotic arm.

3. The robotic MIG welding torch system of claim 1, wherein a bearing is disposed in each opening to facilitate movement of the slidable adapter plate along the bolts.

4. The robotic MIG welding torch system of claim 1, wherein said resilient members are coil springs.

5. The robotic MIG welding torch system of claim 1, including a mounting plate connected to the mounting surface of the slidable adapter plate for mounting the wire feeder on the slidable adapter plate.

* * * * *